(12) United States Patent
Obrejanu

(10) Patent No.: US 8,376,053 B2
(45) Date of Patent: Feb. 19, 2013

(54) FLUID FLOW CONDUIT, METHOD AND USE

(75) Inventor: Marcel Obrejanu, Calgary (CA)

(73) Assignee: Premium Artificial Lift Systems Ltd., Calgary, Alberta (CA)

( * ) Notice: Subject to any disclaimer, the term of this patent is extended or adjusted under 35 U.S.C. 154(b) by 876 days.

(21) Appl. No.: 11/906,311

(22) Filed: Oct. 1, 2007

(65) Prior Publication Data

US 2009/0084557 A1 Apr. 2, 2009

(51) Int. Cl.
*E21B 43/16* (2006.01)
*E21B 17/22* (2006.01)

(52) U.S. Cl. ..................... 166/369; 166/242.3

(58) Field of Classification Search .................. 166/105, 166/105.4, 369, 242.1, 242.3, 177.7, 105.1; 138/122, 42, 39
See application file for complete search history.

(56) References Cited

U.S. PATENT DOCUMENTS

| | | | | |
|---|---|---|---|---|
| 1,510,156 | A * | 9/1924 | Noack | 138/37 |
| 3,719,207 | A | 3/1973 | Takeda | |
| 3,916,504 | A * | 11/1975 | Thorne et al. | 29/455.1 |
| 4,111,402 | A | 9/1978 | Barbini | |
| 6,155,751 | A | 12/2000 | Lane et al. | |
| 6,325,148 | B1 | 12/2001 | Trahan et al. | |
| 6,749,374 | B1 | 6/2004 | Lane et al. | |
| 6,755,250 | B2 * | 6/2004 | Hall et al. | 166/265 |
| 6,988,551 | B2 | 1/2006 | Evans | |
| 7,160,024 | B2 * | 1/2007 | Dougherty et al. | 366/336 |
| 7,160,025 | B2 | 1/2007 | Ji et al. | |
| 2003/0019533 | A1 | 1/2003 | Demarest et al. | |
| 2003/0085185 | A1 | 5/2003 | Kouba | |
| 2004/0074534 | A1 | 4/2004 | Lane et al. | |
| 2004/0134557 | A1 * | 7/2004 | Cymbalisty | 138/177 |
| 2005/0056427 | A1 | 3/2005 | Clemens et al. | |
| 2005/0061380 | A1 * | 3/2005 | Houston et al. | 138/39 |
| 2006/0196658 | A1 | 9/2006 | Belcher | |
| 2007/0157985 | A1 * | 7/2007 | Caro et al. | 138/40 |
| 2008/0257436 | A1 | 10/2008 | Caro et al. | |

FOREIGN PATENT DOCUMENTS

| | | |
|---|---|---|
| CA | 2364516 | 6/2003 |
| CA | 2580956 | 3/2006 |
| GB | 729618 | 5/1955 |
| GB | 2423805 | 9/2006 |
| WO | WO 00/38591 | 7/2000 |
| WO | WO 2004/083706 | 9/2004 |

OTHER PUBLICATIONS

Simpson, David A.; Vortex Flow Technology Finding New Applications; Oct. 31-Nov. 6, 2003, RMOJ, vol. 83, No. 45.

(Continued)

*Primary Examiner* — Thomas Beach
*Assistant Examiner* — James Sayre
(74) *Attorney, Agent, or Firm* — Cozen O'Connor

(57) ABSTRACT

The invention concerns a section of tubing or other conduit having a flow passage. The flow passage extends through the tubing and incorporates a member extending through the passage and guides which constrain a fluid flowing through the flow passage to flow around the member along a path which is longer than an axial length of the flow passage in a fluid flow direction. The guides may define an annular path. The conduit may comprise an inside wall and the guides may comprise a combination of at least one spiral channel defined along the inside wall and the member may be a sucker rod extending along the flow passage.

16 Claims, 8 Drawing Sheets

OTHER PUBLICATIONS

Porier, Michael R.; Minimum Velocity Required to Transport Solid Particles from the 2H-Evaporator to the Tank Farm; Westinghouse Savannah River Company with the US Department of Energy; WSR-TR-2000-00263.

Texas A&M Lab Testing; Vortex Flow, Vortex Downhole Tools Case Study 2004.

* cited by examiner

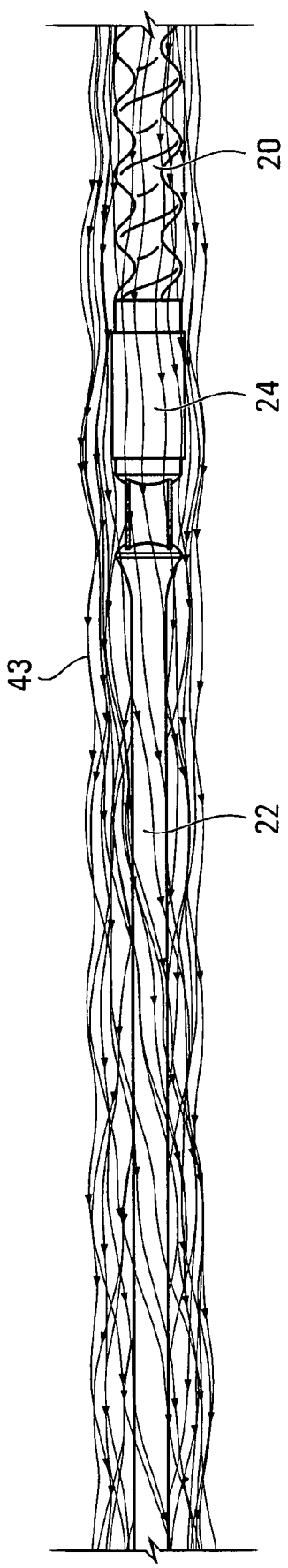

FLUID FLOW CONDUIT, METHOD AND USE

FIELD OF THE INVENTION

This application relates to a fluid flow conduit, method and use and, in particular, a fluid flow conduit, method and use which may be used in oil and/or gas wells.

BACKGROUND OF THE INVENTION

One way of producing oil and/or gas is to pump fluid through production tubing from a downhole formation to the surface. The fluid may include a mixture of oil, gas and water. There is also a considerable amount of solid particles which are washed out of the downhole formation and are mixed with the fluids. For example, in heavy oil production, it is desirable to produce some of the formation sand. The production of the sand is desirable because it can create or increase the flow passages through the downhole formation. In time, this will allow easier flow of fluids from the formation.

The fluid produced from the downhole formation is usually pumped to the surface with downhole pumps. The downhole pumps can, for example, be progressing cavity pumps, piston pumps, hydraulic pumps, jet pumps, or electric submersible pumps.

The solid particles which are pumped out of the formation sometimes tend to accumulate on the top of the downhole pump and eventually plug the tubing and stop production. When this blockage happens, it is a costly operation to clean the tubing and restart the production in the well. If the downhole pump is powered by a sucker rod, sand can jam the sucker rod string and cause it to break. This leads to expensive operations to get the well back into production.

Solid particles are also a problem in horizontal wells. In the horizontal section of a well, the solid particles will tend to settle in the lower part of the tubing, restricting the flow area of the tubing. This can create a back-pressure on top of the pump and eventually plug the tubing.

SUMMARY OF THE INVENTION

In a broad aspect, the invention provides a conduit comprising a flow passage, a member extending through the flow passage and guides which constrain a fluid flowing through the flow passage to flow along a path around the member which is longer than a length of the flow passage in a fluid flow direction.

In some embodiments, the guides define a spiral path.

In some embodiments, the conduit comprises an inside wall and the guides comprise at least one spiral channel defined along the inside wall.

In some embodiments, the flow member comprises a rod extending centrally along the flow passage.

In some embodiments, the rod comprises a segment of a sucker rod.

In some embodiments, the cross-sectional area between the inside diameter of the guides and the outside diameter of the member is sized to allow passage of production tools through the flow passage.

In some embodiments, the path is sufficiently longer than an axial length of the flow passage in a fluid flow direction to increase a fluid flow velocity to at least a critical velocity to maintain solid particles in suspension in a flowing fluid.

In some embodiments, at least one spiral channel has a pitch adapted to increase a fluid flow velocity to at least a critical velocity to maintain solid particles in suspension in a flowing fluid.

In some embodiments, at least one spiral channel comprises three channels which define the inside wall.

In some embodiments, the conduit is adapted to connect to a segment of production tubing and a minimum inside diameter of the conduit is approximately equal to an inside diameter of the segment of production tubing and the maximum outside diameter of the conduit is approximately equal to an outside diameter of a production tubing coupling for the segment of production tubing.

In some embodiments a cross-section of the channel is defined substantially by an arc of a circle.

In some embodiments, at least one spiral channel is defined by projections from the inside wall into the flow passage.

In some embodiments, the conduit has a substantially uniform wall thickness.

In some embodiments, a segment of production tubing comprises the conduit.

In some embodiments, the conduit comprises an adapter for connection to an outflow end of a downhole pump.

In some embodiments, an inside diameter of the segment of production tubing is equal to a standard diameter for production tubing for use with the downhole pump.

In some embodiments, an extension of a pump housing comprises the conduit.

In some embodiments a method of increasing the fluid flow velocity internal to a conduit comprises guiding the fluid to flow in a path which is longer than a length of a flow passage of the conduit in a fluid flow direction.

In some embodiments increasing the fluid flow velocity internal to the conduit comprises directing the fluid to flow in a spiral path through the conduit.

In some embodiments the method maintains solid particles in suspension in a fluid pumped from an oil and/or gas well.

In some embodiments, the conduit is used as a segment of production tubing to alter the resonance frequency of the production tubing.

BRIEF DESCRIPTION OF THE DRAWINGS

Examples of embodiments of the invention will now be described with reference to the attached drawings in which:

FIG. 5 is a schematic representation of the flow path of fluids in the embodiment of FIG. 2;

DETAILED DESCRIPTION OF THE PREFERRED EMBODIMENTS

Figure 1:
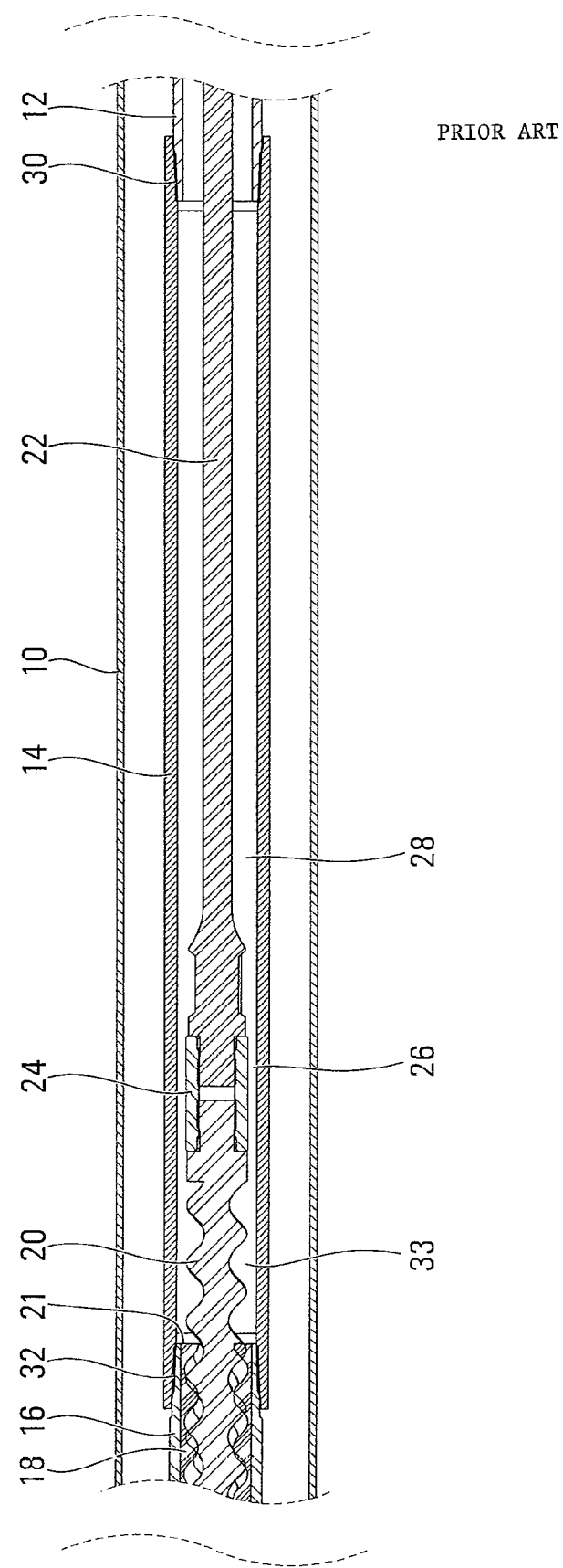
FIG. 1 is a cross-sectional view of a section of production casing, production tubing, a progressing cavity pump and a sucker rod according to the prior art.

FIG. 1 depicts a connection from a progressing cavity pump arrangement to a section of production tubing, according to the prior art. A section 10 of production casing is also depicted. The production casing is typically cylindrical and extends from the surface to the formation which is to be produced. Production tubing 12 is also typically cylindrical and extends from the surface down to the area of the formation being produced. The production tubing 12 has a smaller diameter than the production casing 10. The space between the production casing 10 and production tubing 12 can be used, for example, to run tools or fluids into and out of the well.

A sucker rod 22 extends through the production tubing 12. The sucker rod is typically a cylindrical rod and has a diameter smaller than that of the production tubing 12. The space between the sucker rod 22 and the production tubing is where fluid being pumped travels. The sucker rod 22 can be rotated by power at the surface and consequently used to power a rotor 20 and a stator 18 arrangement at the downhole end of the production tubing 12.

The production tubing 12 is connected to a straight tubing joint 14 by a tubing connection 30. The tubing connection 30 can typically be a thread connection. The straight tubing joint 14 has a tubular shape with circular cross-section.

The downhole end of the straight tubing joint 14 is connected to a stator housing 16 by stator connection 32 which may be a threaded connection. The stator 18 is bonded within the stator housing 16. The downhole end of the sucker rod 22 is connected via a sucker rod coupling 24 to the rotor 20. The rotor 20 has a spiral outer surface. The stator 18 has a spiral inner surface.

The downhole end of the sucker rod 22 is connected to the upward end of the rotor 20 via a sucker rod coupling 24. The sucker rod coupling may, for example, be connected by a threaded connection.

The progressing cavity pump operates as follows: Power is provided to the sucker rod 22 at the surface to rotate the sucker rod 22. Rotation of the sucker rod 22 causes rotation of the rotor 20. Rotation of the rotor 20 within the stator 18 causes fluid within the stator to be pumped upward. FIG. 1 shows overlap or interference between the rotor 20 and the stator 18. The stator 18 is an elastomeric material, such as rubber, and has a double helix. The rotor is steel and has a single helix. When the rotor turns inside the stator, there is a cavity created between the stator 18 and the rotor 20 that travels upwards. The overlap or interference between the stator 18 and rotor 20 provides the seal required between the cavities.

The pumped fluid exits the stator 18 in pressure pulses and generates a turbulent flow as it enters the stator exit region 33. The turbulent flow will keep the solids in suspension in the exit region.

The pumping action causes fluid to flow from the stator exit region 33 through the restricted flow region 26. The flow is restricted in this region because the cross-sectional area of the region is less than that of the stator exit region 33. When the pumped fluids are forced into this smaller flow region 26, the pressure pulses generated by the pump will create back pressure pulses against the pump with potential damage to the elastomeric stator. The increases in flow velocity, results in efficiency losses due to elevated friction losses. The increased velocity around a flow restriction such as the smaller flow region 26 also results in erosion of the rotor head, coupling and tubing.

When the pumped fluids exit the restricted flow region 26 around the coupling, there is a pressure drop and a drop in velocity of the fluid flow as pumped fluids enter the larger flow region 28 above the coupling. The pumped fluids will normally contain some solid particles. There is a minimum velocity rate or critical velocity that is necessary to keep the solids flowing to the surface with the pumped fluids. Due to the fluid velocity drop above the coupling 24, the velocity may drop below the critical velocity for keeping the solid particles in suspension. The solid particles can then fall against the flow, on top of coupling 24 and on the top 21 of the stator housing 16. Over time, solids can accumulate here, blocking the flow of fluids and trapping the rotor and sucker rod string.

Any increase in the diameter of the straight tubing joint 14 to increase the area of the region 26 will cause a corresponding increase in the flow region 28 above the coupling further dropping the flow velocity and allowing further solid particles to be deposited on the top of the stator housing 21. However, the diameter of the straight tubing joint 14 cannot be decreased to increase the fluid flow rate because any restriction in the flow of fluid at the pump discharge will result in a back-pressure against the pump that causes loss of efficiency and possible damage to the pump stator.

Throughout the regions 33, 26 and 28, the fluid flows in a generally linear direction. In other words, for a given length of the straight tubing joint 14, the flow path of the fluid is equal to the length of the straight tubing joint 14.

Figure 2:
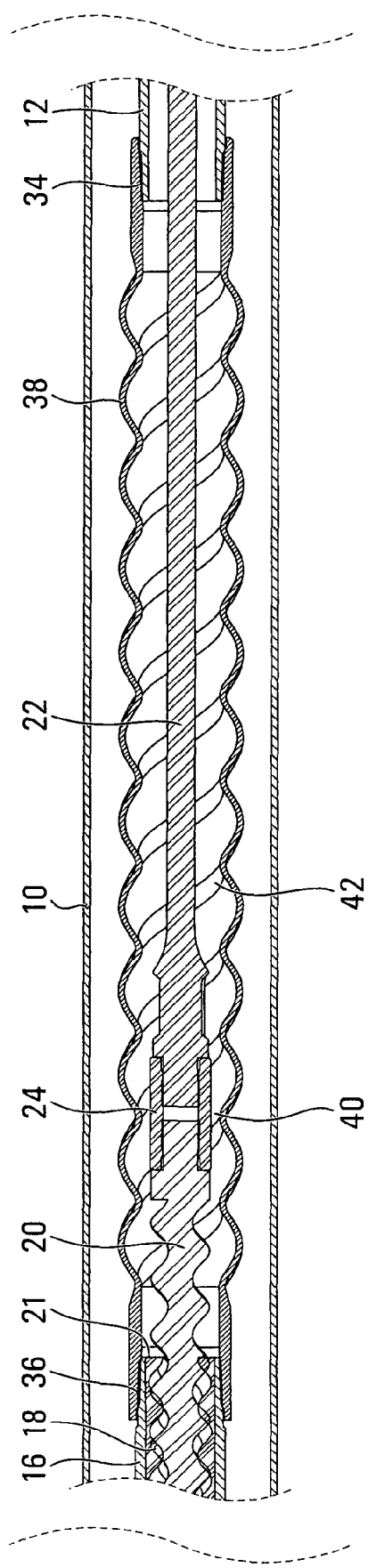
FIG. 2 is a cross-sectional view of a section of production casing, production tubing, a progressing cavity pump and a sucker rod according to an embodiment of the invention.

With reference to FIG. 2, an embodiment of the invention comprises a section of tubing or other conduit 38 having a flow passage 42. The flow passage 42 extends through the tubing and incorporates guides which constrain a fluid flowing through the flow passage to flow along a path which is longer than an axial length of the flow passage in a fluid flow direction. The guides may define an annular path. The conduit 38 may comprise an inside wall and the guides may comprise a combination of at least one spiral channel defined along the inside wall and solid member which is a flow obstruction, blocker or impediment to fluid flow in the area occupied by the member such as a sucker rod 22 extending along the flow passage 42.

The fluid therefore travels at an increased velocity to travel the same axial distance. The flow velocity can be increased to a minimum or critical velocity required to maintain solid particles in suspension in a flowing fluid. Regarding the minimum or critical velocity, see "Minimum Velocity Required to Transport Solid Particles from the 2H-Evaporator to the Tank Farm", Poirior M. R., U.S. Department of Energy, Technical Report, WSRC-TR-2000-00263, Sep. 27, 2000.

In further detail, FIG. 2 shows, as with the prior art embodiment of FIG. 1, there is an outer production casing 10. The sucker rod 22 is connected by the sucker rod coupling 24 to the rotor 20. The stator 18 is held within the stator housing 16. The rotor 20 is rotated by the sucker rod 22 to pump fluid upwards.

In the embodiment depicted in FIG. 2, the straight tubing joint 14 is replaced by a spiral tubing 38. Although depicted as a tubing joint in this embodiment, it will be understood that other embodiments contemplate a section of tubing or conduit and may also be an extension of the pump stator housing 16. The spiral tubing 38 has spiral channels defined along its inside surface. An example of a spiral tubing joint is shown in further detail in FIGS. 3A and 3B.

The spiral tubing 38 has a tubing connection 34 at an upper end and a stator connection 36 at the lower end. These connections can, for example, be threaded connections. However, any form of connection such as coupling may be used. The connections 34 and 36 may be eliminated and the connection to and from the tubing 38 may be made entirely externally.

Figure 3A:
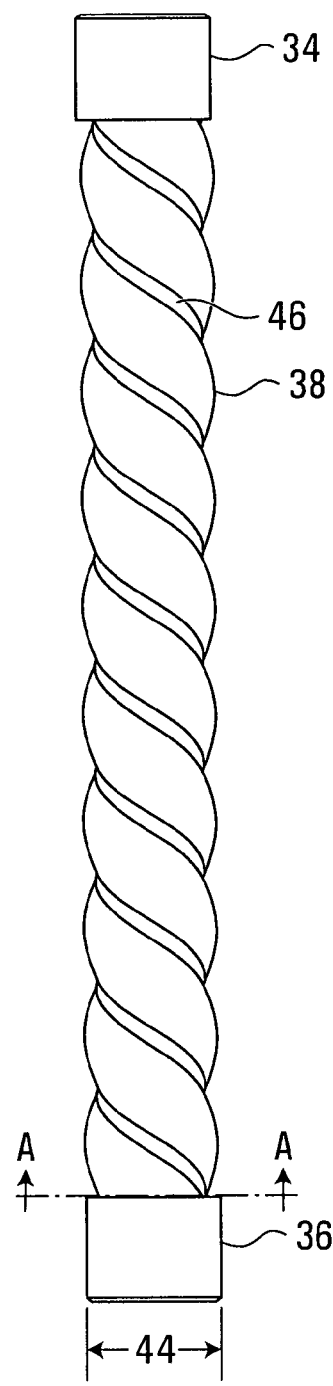
FIG. 3A is a side view of a spiral tubing section according to the embodiment of FIG. 2.
Figure 3B:
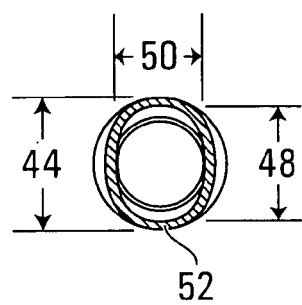
FIG. 3B is a section taken along line A-A of FIG. 3A.

FIG. 3B depicts a cross-sectional view of FIG. 3A taken along section A-A. FIG. 3A shows that the spiral tubing 38 has a maximum outside diameter 44 of, for example, 5 inches and a maximum inside diameter 48 of, for example, 4.50 inches, a minimum outside diameter 50 of, for example, 3.954 inches. The section of the tube wall 52 appears oval which means that there are two spiral channels shown in the embodiment of FIGS. 3A and 3B. More, for example three or fewer spiral channels may be provided within the scope of the invention. The channels may have smooth and rounded sides of circular section as depicted in FIGS. 2, 3A and 3B or have other shapes which, for example, have more squared corners.

Turning again to FIG. 2, the combination of the sucker rod 22 and the spiral tubing 38 will cause the fluid exiting the stator 18 to follow a spiral path as the fluid is pumped upwards. In contrast to the configuration of FIG. 1, it will be appreciated that the flow region 40 in FIG. 2 around the sucker rod coupling 24 does not cause a significant restriction in the flow. The spiral flow path is depicted in FIG. 5 which shows the flow path of the fluid with spiral flow lines 43 as it flows around the rotor 20, the sucker rod coupling 24 and the sucker rod 22 inside the spiral tubing 38. Further, the fluid will flow through the spiral tubing 38 at a higher velocity than the fluid would flow in a straight tubing joint 14 of the same inside diameter. The increased velocity may cause the fluid to flow at a sufficient velocity to keep solid particles suspended in the fluid and prevent them from accumulating on the top of the coupling 24 and on the top 21 of the stator housing 16.

Figure 4A:
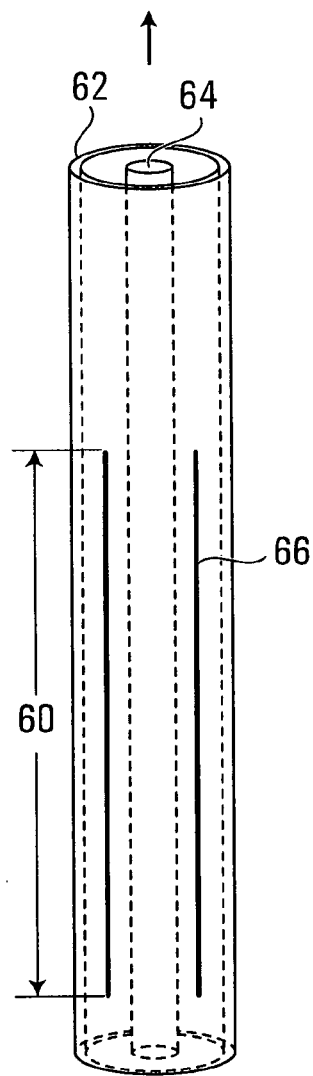
FIGS. 4A, 4B and 4C are schematic views of straight and spiral flow paths.
Figure 4B:
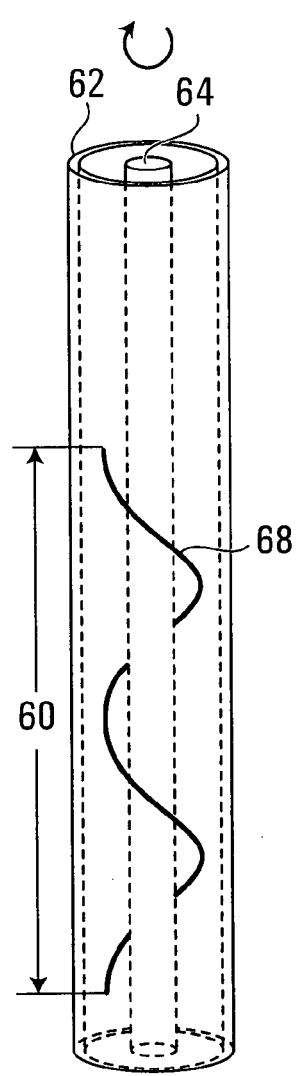
Figure 4C:
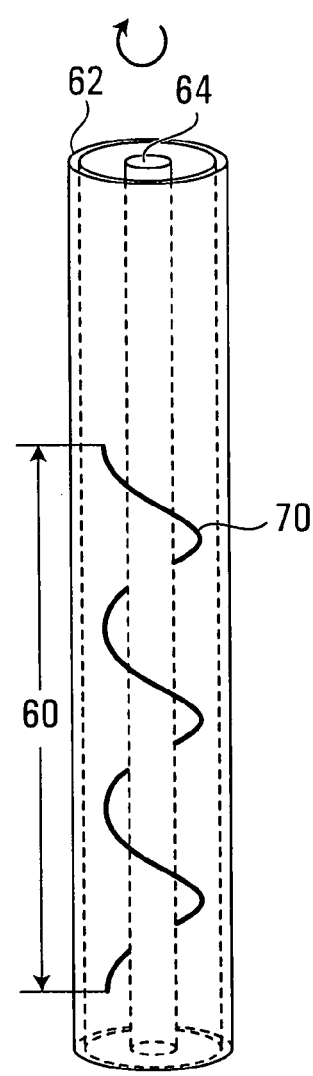

FIGS. 4A, 4B, and 4C are schematic representations of the flow path for a fluid. A unit length, for example, 12 inches of pipe is labelled 60. FIG. 4A depicts a straight flow path. FIG. 4B depicts a spiral flow path 68 with two turns and FIG. 4C depicts a spiral flow path 70 with three turns. It will be appreciated that the flow path 68 is longer than the flow path 66 and the flow path 70 is longer again. The path shown in FIG. 4A is a direct path from one end of the pipe, whereas the path shown in FIG. 4B is indirect and the path shown in FIG. 4C is even more indirect. In particular, flow path 66 is 12 inches, flow path 68 is 18.3 inches and flow path 70 is 23.6 inches. Fluid flowing along the flow path 70 will travel at a faster speed in order to reach the end of unit length 60 in the same time as the fluid flowing in the straight path 66, thus forcing the fluid in the flow paths 68 and 70 to travel at a higher velocity. This is because the velocity of the fluid has a component traverse to the direction of the pipe. The fluid in FIGS. 4A, 4B and 4C have the same axial velocity component in the axial direction of the pipe but the addition of transverse velocity component to the fluid flowing along the path in FIG. 4B means the total combined axial and transverse velocity of the fluid flowing along the path of FIG. 4B is higher than the velocity of the fluid flowing along the path of FIG. 4A. The fluid flowing along the path of FIG. 4C will have an even larger transverse component and so an even higher total velocity than the fluid in FIG. 4B.

As previously discussed, increasing the velocity of the fluid can keep the fluid velocity above the critical velocity required to keep the solid particles in suspension. FIGS. 4A to 4C depict a segment of tubing or other conduit 62 and a sucker rod 64 or other fluid blocker or impediment to fluid flow. It will be appreciated that the impediment to fluid flow need not be precisely along the central axis of the conduit and need not be a sucker rod. For example, the rotor 20 performs the function at the exit end from the pump. Equally, it will be appreciated that the present invention is applicable to applications other than the tubing segment for oil and/or gas production.

Figure 4D:
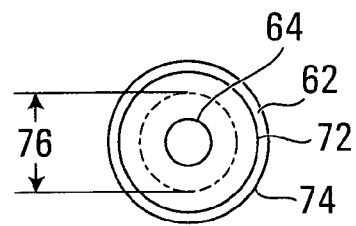
FIG. 4D is a cross-sectional view of the spiral flow path depicted in FIGS. 4B and 4C.

FIG. 4D depicts another exemplary set of dimensions for a spiral tubing. In this embodiment, the outside tubing diameter 74 is, for example, 3.5 inches. The inside tubing diameter 72 is, for example, 2.992 inches. The median diameter 76 of the tubing as defined by the spirals is, for example, 2.121 inches. The central restriction 64 has a diameter of, for example, 1.250 inches.

In practice, there are many possible combinations of production tubing sizes and sucker rod sizes. Each well has a different size, depth and production rate and the production tubing can be, for example, 2.375, 2.875, 3.000, 4.500 or 5.500 inches and it might need a sucker rod string of, for example, 0.625, 0.750, 1.000, 1.125, 1.250 or 1.500 inches. The size selection is based on the production requirements. The sizing of the spiral tubing can be adapted to an existing tubing sucker rod combination. In one embodiment, the minimum inside diameter of the spiral tubing is equal to the inside diameter of the production tubing used in that particular well and the maximum outside diameter of the spiral tubing is equal to the outside diameter of the production tubing coupling used in the well.

Figure 6:
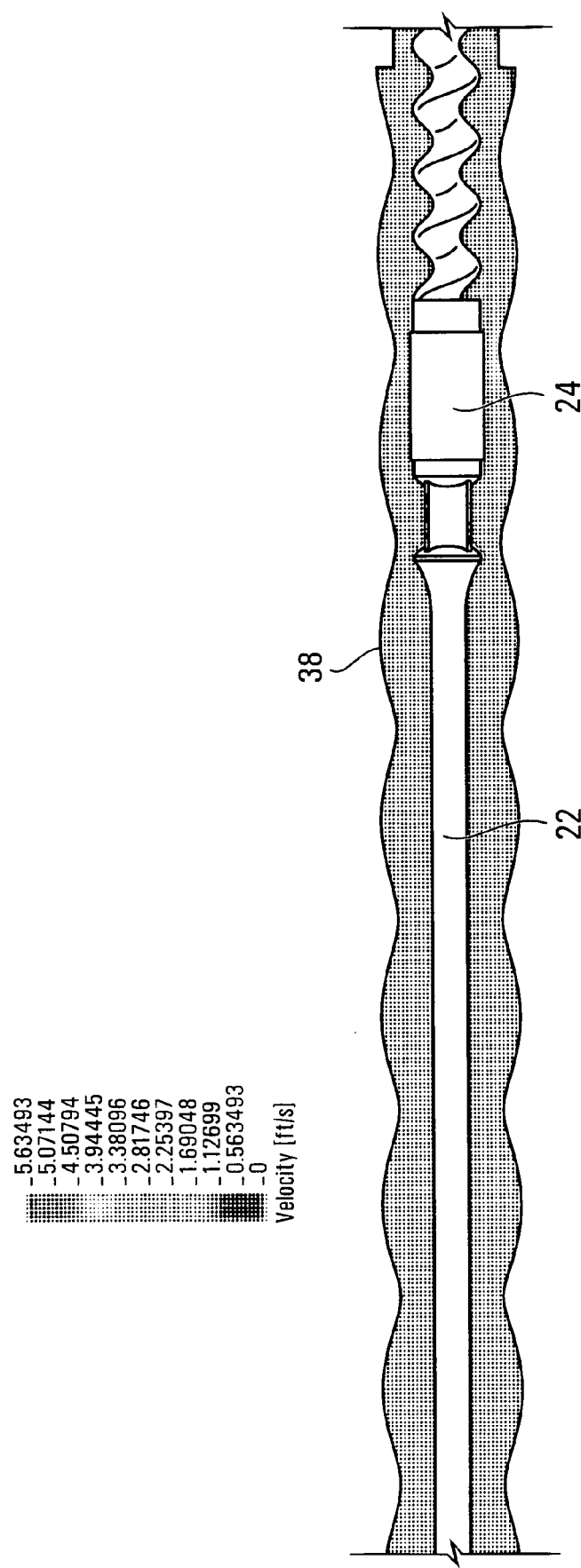
FIG. 6 is a schematic view of the flow velocity distribution of the embodiment of FIG. 2.
Figure 7:
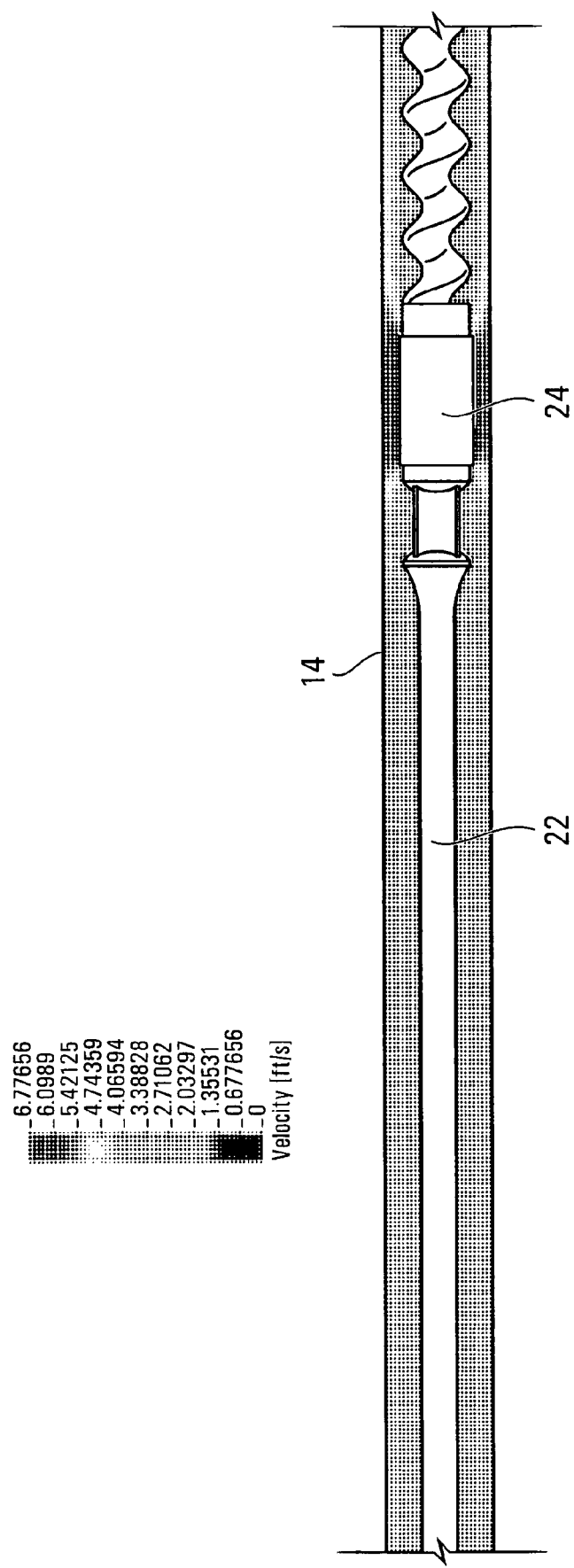
FIG. 7 is a schematic view of the flow velocity distribution of the embodiment of FIG. 1.
Figure 8:
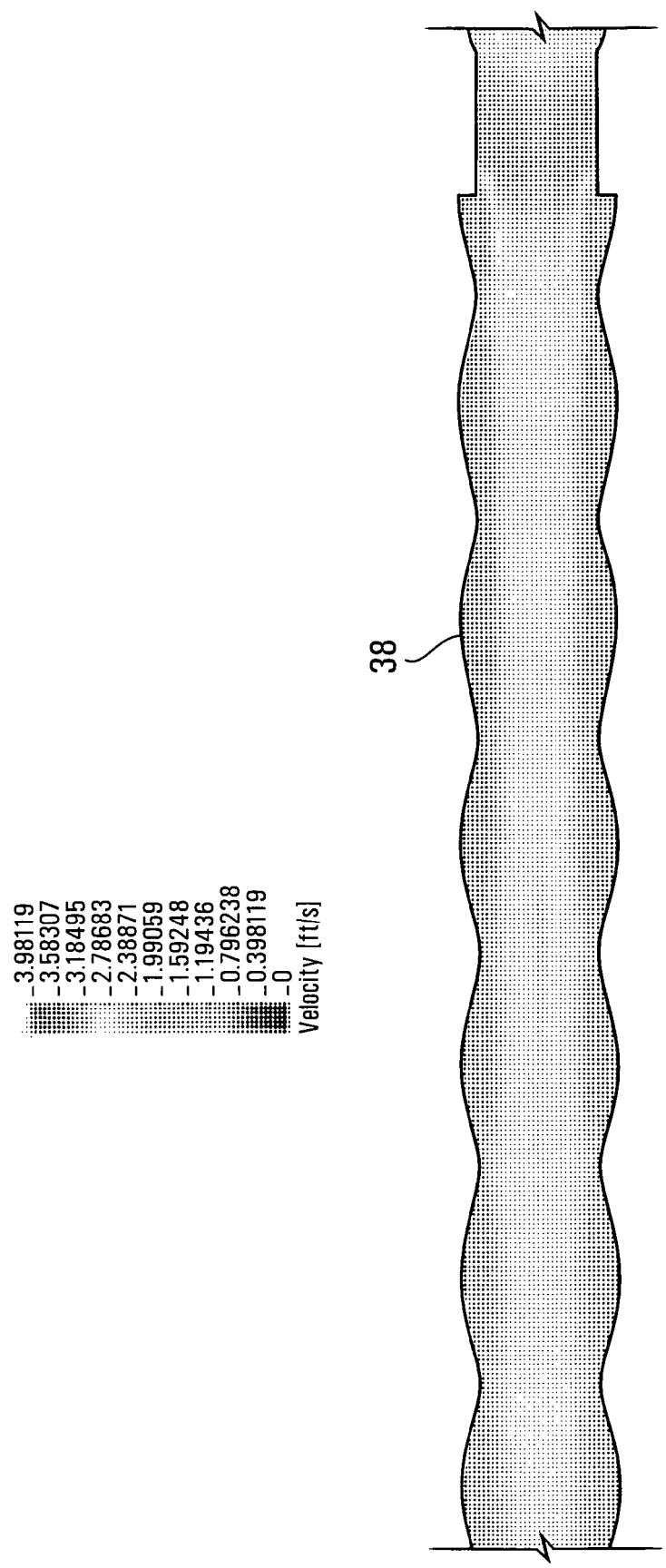
FIG. 8 is a schematic view of the flow velocity distribution of the spiral tubing section of FIG. 3A when empty.

FIGS. 6 and 7 provide examples flow velocity profiles for the present invention and the prior art respectively. FIG. 8 provides an example of the velocity profile of a spiral tubing of the present invention without the flow blocker or sucker rod. The higher density of the dots in the FIGS. 6, 7 and 8 indicate an increased flow velocity. It will be appreciated that only FIG. 6 depicts a substantive uniform flow velocity throughout. FIG. 7 indicates a high flow velocity around the coupling 24. In FIG. 8 when the central restriction is not present, there is a high flow velocity down the center of the tube, since the absence of the sucker rod allows straight flow down the center of the tube. In the embodiment of FIGS. 6, 7 and 8, the nominal size of the pipe is 3.5 inches, the spirals have a 12 inch pitch and the flow simulation is shown at 300 barrels per day flow rate.

An advantage of the present embodiment is that it provides for an increased velocity of the fluid flow without in any way blocking the passageway from the stator 18 to the production tubing 12. It is a passive means, unlike the active means of the pump. It is also integral to the tubing string, rather than an external apparatus. Other passive means for increasing the flow velocity other than the spiral tubing are also contemplated within the scope of the invention. Other means of increasing the length of the flow path are also contemplated other than a strictly spiral tube.

The creation of the spiral flow inside the tubing increases the velocity of the fluid flowing upward through the tubing. The higher velocity will help to keep the solids in suspension and will prevent the solid particles from falling back against the flow on top of the pump stator. Similarly, in the case of a horizontal well which uses the spiral tubing, the solids will be washed away from, or prevented from accumulating on the lower side of the tubing and pushed to the surface.

Further, in a multi-phase flow environment (i.e. a fluid including some combination of water, oil, gas and solid particles), the disorganized or turbulent flow of fluid increases friction losses inside the tubing which leads to higher pumping costs. This will occur, for example, in the prior art embodiment depicted in FIG. 1 in the flow region 26. In contrast, the spiral flow of the present application will organize the flowing fluid, creating centrifugal forces that will force the water phase against the wall of the tubing, will reduce the frictional forces and will discourage the deposition of paraffins and scale on the tubing wall. At the same time, any free gas present in the tubing will be forced toward the center of the tubing against the sucker rod reducing the friction/drag forces against the sucker rod. Reducing the friction losses against the tubing and sucker rod can result in considerable energy savings for the pumping operation.

The spiral flow pattern will continue through the straight production tubing above the spiral tubing until it attenuates. More joints of spiral tubing can be installed throughout the production tubing string to renew and maintain the spiral flow pattern all the way to the surface.

Another advantage of the use of the spiral tubing 38 is that it has a different resonance frequency than the production tubing 12. This means that the spiral tubing can be used to dampen resonance vibrations generated by the production pump that could otherwise damage the tubing string.

The spiral joints of tubing can be installed at different levels in the production tubing to maintain the spiral flow pattern and dissipate harmful vibrations.

Numerous modifications and variations of the present invention are possible in light of the above teachings. It is therefore to be understood that within the scope of the appended claims, the invention may be practised otherwise than as specifically described herein.

I claim:

1. A conduit comprising:
an inside wall;
a flow passage;
a member extending through the flow passage; and
guides defining a spiral path comprising at least one spiral channel along the inside wall, the guides constraining a fluid flowing through the flow passage to flow along the spiral path around the member, which spiral path is longer than a length of the flow passage in a fluid flow direction;
wherein a cross-sectional area of the flow passage of the spiral path between an inside diameter of the guides and an outside diameter of the member is unobstructed and the unobstructed cross-sectional area is sized to allow passage of production tools through the flow passage; and
wherein a cross-section of the at least one channel, in a direction perpendicular to a spiral flow direction of the channel, is defined substantially by an arc of a circle.

2. The conduit of claim 1 wherein the flow member comprises a rod extending centrally along the flow passage.

3. The conduit of claim 2 wherein the rod comprises a segment of a sucker rod.

4. The conduit of claim 1 wherein the path is sufficiently longer than an axial length of the flow passage in a fluid flow direction to increase a fluid flow velocity to at least a critical velocity to maintain solid particles in suspension in a flowing fluid.

5. The conduit of claim 1 wherein the at least one spiral channel has a pitch adapted to increase a fluid flow velocity to at least a critical velocity to maintain solid particles in suspension in a flowing fluid.

6. The conduit of claim 5 wherein the at least one spiral channel comprises at least three channels which define the inside wall.

7. The conduit of claim 1 wherein the conduit is adapted to connect to a segment of production tubing and a minimum inside diameter of the conduit is approximately equal to an inside diameter of the segment of production tubing and the maximum outside diameter of the conduit is approximately equal to an outside diameter of a production tubing coupling for the segment of production tubing.

8. The conduit of claim 1 wherein the at least one spiral channel is defined by projections from the inside wall into the flow passage.

9. The conduit of claim 1 having a substantially uniform wall thickness.

10. A segment of production tubing comprising the conduit of claim 1.

11. The segment of production tubing of claim 10 comprising an adapter for connection to an outflow end of a downhole pump.

12. The segment of production tubing of claim 10 wherein an inside diameter of the segment of production tubing is equal to a standard diameter for production tubing.

13. An extension of a pump housing comprising the conduit of claim 1.

14. A method of altering the resonance frequency of a production tubing comprising replacing a straight segment of the production tubing with the conduit of claim 1.

15. A method of increasing the fluid flow velocity internal to a conduit that comprises a flow passage, a member extending through the flow passage, and guides; the method comprising guiding the fluid to flow in a spiral path comprising at least one spiral channel which is longer than a length of the flow passage of the conduit in a fluid flow direction through constraining the fluid with the guides; wherein a cross-sectional area of the flow passage of the spiral path between an inside diameter of the guides and an outside diameter of the member is unobstructed and the unobstructed cross-sectional area is sized to allow passage of production tools through the flow passage between an inside diameter of the guides and the outside diameter of the member is unobstructed and the unobstructed cross-sectional area is sized to allow passage of production tools through the flow passage; and wherein a cross-section of the at least one channel in a direction perpendicular to a spiral flow direction of the channel is defined by an arc of a circle.

16. A method of maintaining solid particles in suspension in a fluid pumped from at least one of an oil well and a gas well comprising the method of claim 15.

* * * * *